Figure 1:
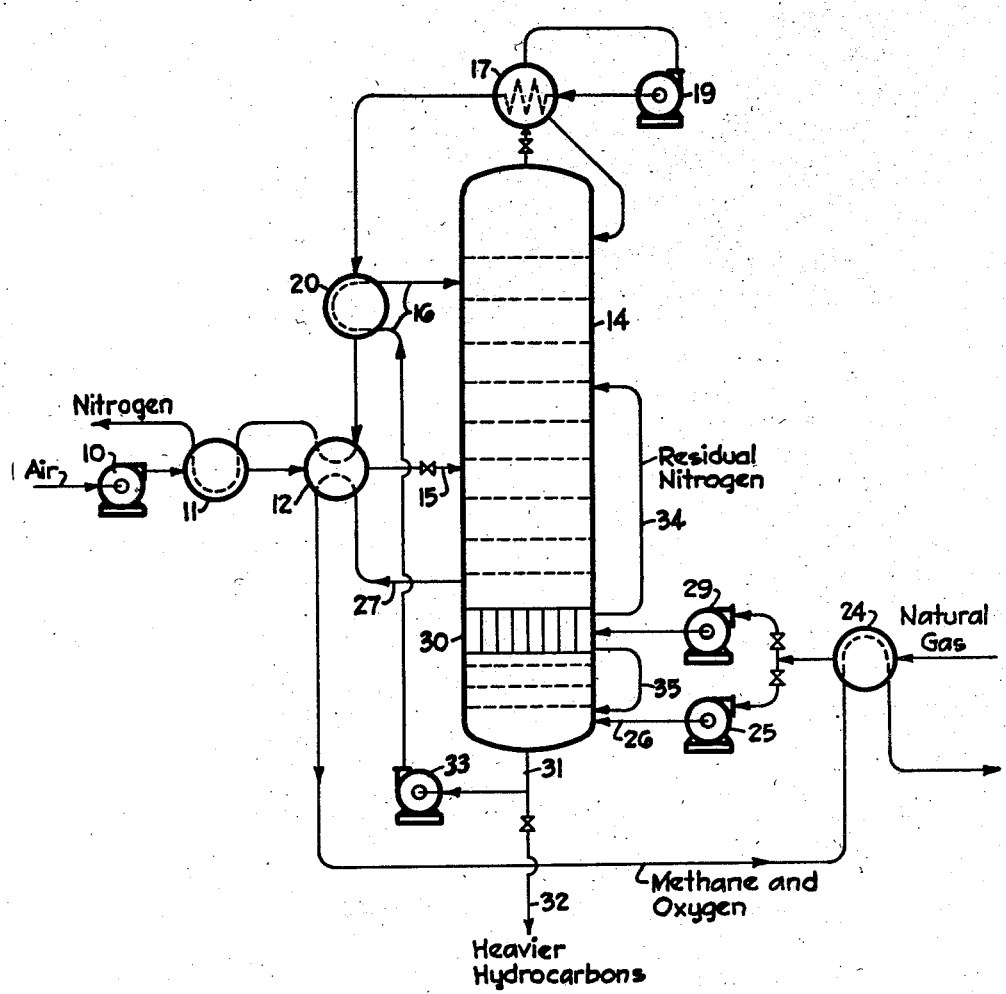

Aug. 22, 1950     P. H. DEMING     2,519,955
PRODUCTION OF HYDROCARBON-OXYGEN MIXTURES
Filed Sept. 3, 1946     2 Sheets-Sheet 2

Inventor: Philip H. Deming
By his Attorney: James Todosevis

Patented Aug. 22, 1950

2,519,955

UNITED STATES PATENT OFFICE 2,519,955

PRODUCTION OF HYDROCARBON-OXYGEN MIXTURES

Philip H. Deming, San Francisco, Calif., assignor to Shell Development Company, San Francisco, Calif., a corporation of Delaware Application September 3, 1946, Serial No. 694,529

12 Claims. (Cl. 62—175.5)

This invention relates to a method for the production of mixtures of two given substances from separate mixtures of each of the given substances with other substances having boiling points and vapor pressures at equivalent temperatures closely related thereto. More particularly, the invention relates to an improved method for the production of mixtures of oxygen and lower molecular weight hydrocarbons and especially gaseous mixtures of oxygen and methane suitable for the preparation of synthesis gas comprising hydrogen and carbon monoxide in the mol ratio of about two to one, the oxygen and methane being obtained, respectively from air and natural gas.

Mixtures of carbon monoxide and hydrogen are useful as synthesis gas for catalytic synthesis therefrom of organic substances, particularly alcohols and hydrocarbons. Until relatively recently, mixtures of carbon monoxide and hydrogen for such uses have been prepared by processes including (1) the "water gas" reaction in which heated coke is caused to react with steam in accordance with the equation $$C + H_2O = CO + H_2$$

(2) partial combustion of coke to yield mixtures of carbon monoxide and carbon dioxide with subsequent removal of the carbon dioxide followed by mixing the carbon monoxide with hydrogen from some suitable source; etc. Among the disadvantages associated with such processes are: the necessity for combining two or more separate carbon monoxide and/or hydrogen producing operations to obtain a mixture having the desired mol ratio of the two substances; the necessity for the removal of carbon dioxide; etc.

More recently methane, or more generally natural gas, has been subjected to reaction with steam and/or with oxygen (air) for the production of desirable synthesis gas mixtures. It is a well-known practice to react methane with steam in the presence of a suitable catalyst to produce hydrogen and carbon dioxide according to the equation $$CH_4 + 2H_2O = 4H_2 + CO_2$$

At higher temperatures the reaction may be represented by the equation $$CH_4 + H_2O = 3H_2 + CO$$

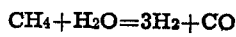

If desired, the CO produced in accordance with the latter reaction may be converted into $CO_2$ at a lower temperature in accordance with the equation $$CO + H_2O = CO_2 + H_2$$

With the removal of the $CO_2$ by well-known means, the method yields hydrogen, the yield and quality of which may be selected in accordance with almost any requirements. In accordance with recently developed processes, combustion gases may be admixed with the methane-steam mixture prior to carrying out the above-indicated reactions, and hydrogen-nitrogen mixtures which are suitable for ammonia synthesis are obtained directly from the process, after removal of the carbon dioxide.

Methane, or more generally natural gas, is subjected to partial combustion with air or oxygen to produce mixtures of carbon monoxide and hydrogen. For synthesis purposes in accordance with the Fischer-Tropsch process, it is desirable that the mol ratio of hydrogen to carbon monoxide in the synthesis gas be very near to 2 to 1 and that the gaseous mixture be substantially free of both carbon dioxide and of free carbon. In order to prevent the formation of these substances, it is essential that the partial combustion of the methane is effected under rather closely controlled conditions as to temperature and ratio of reactants, the former being at least partially dependent upon the latter. It appears that the most suitable manner of operating as developed to date is to produce an intimate gaseous admixture of substantially pure methane and substantially pure oxygen in the ratio of slightly more than one mol of oxygen for each two mols of methane, preheat the admixture to a temperature in the order of 1000° F. and to effect the reaction of the methane and oxygen and at a temperature in the order of about 2000–2200° F.

Mixtures of methane and oxygen to be used for the process as indicated above are prepared from natural gas and air as the basic raw materials. However, natural gas and air are unsuitable for direct manufacture of the synthesis gas for this purpose. Purification of these raw materials, prior to synthesis gas manufacture, is necessary. The primary purpose of such purification is the rejection of nitrogen from the raw material. A secondary purpose is the removal and recovery of condensable hydrocarbons in natural gas. In conventional process design, casing-head gasoline is recovered from natural gas by absorption and/or condensation by refrigeration, nitrogen is separated from air by low temperature fractionation, and the product methane and oxygen streams are mixed for partial combustion to the synthesis gas. Process requirements, in conventional design, for mechanical compression and heat exchanger equipment of special design are usually high in that the reflux for the oxygen-nitrogen separation is provided entirely by mechanical compression with subsequent heat exchange to the necessary low temperatures. The theoretical compression needed is further greatly magnified by low process efficiency.

Thus, among the disadvantages in this method of preparing a suitable mixture of pure methane and pure oxygen from natural gas and air, the method is inherently inefficient in certain respects, particularly from the standpoint of energy economy. Fundamentally, it is seen that a certain amount of energy degradation is involved in the separation of the methane from the other constituents of the natural gas, a further amount of energy degradation is involved in the separation of the oxygen from the nitrogen of the air, and the energy degradation resulting from the mixing of the methane and the oxygen is accepted without deriving any energy return therefrom.

It is an object, therefore, of the present invention to provide an improved method for the production of methane-oxygen mixtures suitable for the manufacture of synthesis gas. Another object is to provide an improved method for the production of uniformly admixed mixtures of methane and oxygen. Still another object is to provide such a method having high energy economy. A further object is to provide a method for the production of methane-oxygen mixtures in which energy of mixing of the components is at least partially utilized to supply the energy required for separation of one of the components from other substances with which it is naturally associated. A still further object is to provide such a method in which it is not necessary to prepare first the pure components prior to mixing.

Figure 2:
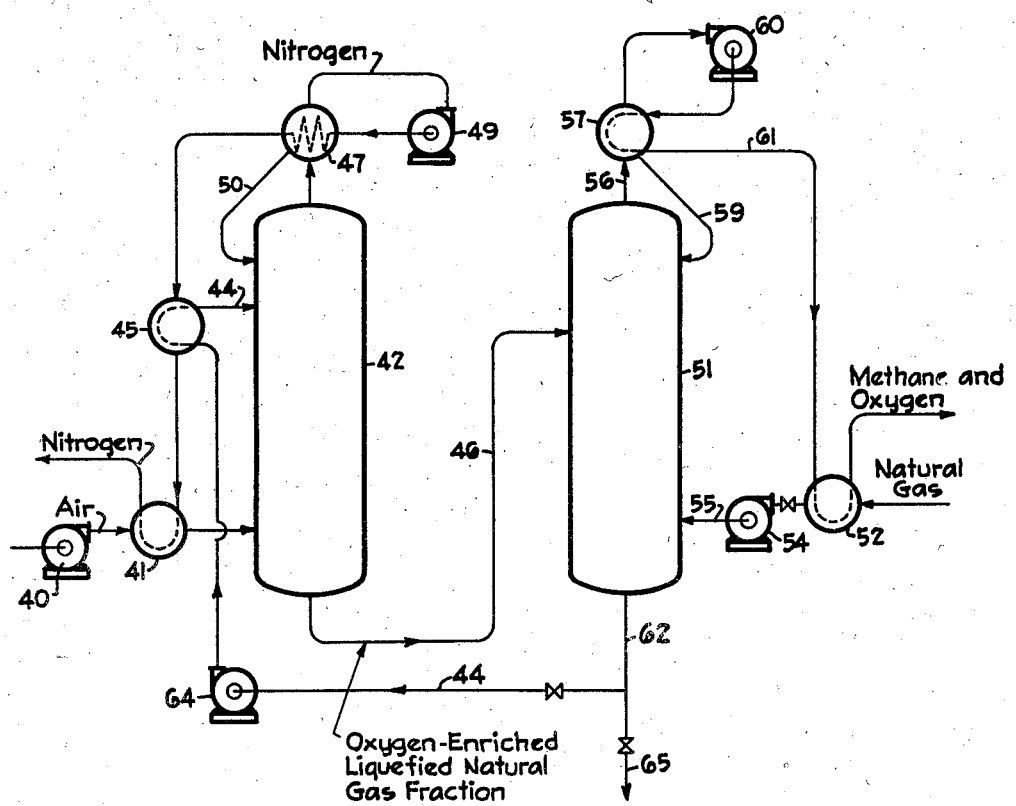

Other objects will become apparent from the following description of the invention which is made with reference to the accompanying drawing which forms a part of the disclosure and wherein, Figure 1 is a process flow diagram of a preferred embodiment of the invention, and Figure 2 is a process flow diagram somewhat similar to that shown in Figure 1, but wherein the absorption and stripping zones are in separate columns.

It has now been discovered that a mixture of methane and oxygen may be produced by a method in which the energy of mixing of the methane and oxygen is utilized at least in part to supply a portion of the energy requirement for separating oxygen from nitrogen of the air. Furthermore, in accordance with the method of this invention, work content of the natural gas is utilized to furnish a portion of the energy required for separation of the nitrogen from the oxygen. Still further, in the method of this invention the latent heat balance resulting from dephlegmatory vaporization of condensables in the natural gas may be used to supply a portion of the energy requirements for the oxygen-nitrogen separation. Also, with the use of the present invention, cold accumulators may be utilized for energy conservation since separated cold nitrogen may be exchanged against air, and cold product methane-oxygen may be exchanged against natural gas, thus minimizing contamination of product oxygen with nitrogen. Condensable components of the natural gas may be removed in the process by incremental refrigeration since the natural gas passes through a refrigerated cycle.

Broadly stated, the method of producing hydrocarbon-oxygen mixtures in accordance with the present invention comprises subjecting air to a rectified absorption by means of a cold hydrocarbon liquid under conditions adapted to effect separation of the oxygen from the nitrogen and to produce an oxygen-enriched hydrocarbon liquid phase, and subsequently subjecting the oxygen-enriched hydrocarbon liquid phase to rectified stripping to produce an oxygen-hydrocarbon fraction therefrom having a predetermined ratio of oxygen to hydrocarbon. The energy required for the stripping operation may be obtained from the work content of the natural gas utilized to supply the hydrocarbon absorption medium and/or the hydrocarbon of the desired hydrocarbon-oxygen mixture. Furthermore, this energy may be transferred to the oxygen-hydrocarbon mixture by direct and/or indirect contact therewith, the manner selected being dependent on the variable composition factors involved in any particular process based upon a particular feed material and the specific final composition desired.

More specifically, the method of producing methane-oxygen mixtures by practicing this invention comprises subjecting air to rectified absorption by a cold hydrocarbon liquid, preferably containing a major proportion of methane and having been obtained from natural gas, to produce an oxygen-enriched hydrocarbon liquid phase, subjecting the oxygen-enriched hydrocarbon liquid phase to rectified stripping by energy exchange, preferably at least partially by direct contact, with a further portion of natural gas, whereby work content of the natural gas is utilized to effect the production of a separated fraction of an oxygen-methane mixture having a predetermined composition, and a residual hydrocarbon liquid fraction which is recycled for further use in rectified absorption of air. The method also comprises flash separation of nitrogen from natural gas and indirect heat exchange thereof with oxygen-hydrocarbon mixture being subjected to stripping, and delivering the separated nitrogen to the rectified absorption zone while delivering the separated liquefied hydrocarbon mixture to the reboiler zone adapted to provide the stripping action in the stripping zone.

Having now stated the objects and purposes of this invention and having broadly described the manner whereby they are attained by practice of the invention, the invention will be described in greater detail with reference to the accompanying drawing.

Referring to Figure 1 of the drawing, air, preferably dry, is heat exchanged in exchangers 11 and 12 against effluent cold nitrogen, the air also being heat exchanged in heat exchanger 12 against a product oxygen-methane mixture, and the thus cooled air is then delivered at a pressure of about 25 p. s. i. a. (pounds per square inch absolute) to an intermediate section of a fractionating column 14 by means of a valved line 15. The fractionating column 14 may be any of the usual types used in the art of rectification, being provided with the usual bubble-cap plates and the like or it may be a packed column, etc. A precooled liquid hydrocarbon fraction obtained from natural gas and which contains a major proportion of methane is fed into an upper section of the column 14 by means of line 16. The air and the hydrocarbon fraction (lean oil) are countercurrently contacted in the upper section of the column to effect rectified absorption of the air resulting in absorption of the oxygen while allowing the more volatile nitrogen to escape. Thus, the nitrogen is replaced from admixture with the oxygen by methane. The nitrogen, which is admixed with some hydrocarbon (methane) vapor in the top of the column 14, is delivered to a heat exchanger 17 wherein the methane content is condensed by indirect heat exchange with a previously separated nitrogen fraction which has been cooled by expansion-cooling in an expander 19, thus providing reflux for the top of the fractionator. The resulting separated, cold nitrogen is then utilized in exchanger 20 to provide for a part of the precooling of the absorption hydrocarbon fraction (lean oil).

The rectified absorption which is thus effected in the upper section of the column produces an oxygen-enriched hydrocarbon liquid phase which is subjected to a rectified vaporization or stripping action in the lower section of the fractionating column. The purpose of the rectified stripping is to produce a separated fraction containing oxygen and methane in a predetermined ratio. The work required to effect this stripping separation is obtained from the work content of the natural gas which is the source of the methane and also of any suitable higher hydrocarbons which may be utilized as rectifying absorption oil. The natural gas under a superatmospheric pressure is cooled in exchanger 24 by a heat interchange with cold product methane-oxygen mixture obtained from the process. This precooled natural gas is expansion-cooled in an expander 25 and the cold material is delivered to the lower section of the column 14 by means of a line 26. This section may be considered as a reboiler section of the column. The cold gaseous material from the expanded natural gas may be said to contain a part of the incremental work energy of the natural gas while under pressure and that this work increment is now utilized to strip the oxygen from the rich oil to produce an oxygen-methane fraction which is withdrawn from the column through a line 27. By this means stripping vapor is supplied to the column. At the same time residual lean absorber oil (hydrocarbon fraction) collecting in the bottom of the column may be augmented by liquefied natural gas constituents to provide the absorber oil and internal refluxing streams. The oxygen-methane fraction withdrawn through line 27 is used to partially precool the feed air in exchanger 12, and it is then further utilized to precool the raw natural gas by means of an exchanger 24.

In the event the natural gas contains an undesirably large proportion of nitrogen, the nitrogen may be partially separated from the hydrocarbons by expansion-cooling in an expander 29, indirectly contacting the resulting cooled mixture by means of an exchanger 30 with the oxygen-hydrocarbon mixture in an intermediate section of the lower part of the column, delivering the residual nitrogen mixed with some methane vapor to an intermediate portion of the rectified absorber zone by means of a line 34 and delivering the liquefied portion of the natural gas to the reboiler section by means of a line 35.

The column pressure is maintained sufficiently above atmospheric pressure that nitrogen reflux can be produced for the top of the column by expansion of the product nitrogen. Nitrogen reflux serves the purpose of reducing methane loss to the top product and also depresses the freezing point of methane present sufficiently to prevent solidification of methane at the low temperatures involved.

It will be understood that the introduction into the lower part of the column of a portion of hydrocarbons higher in molecular weight than methane serves to supply partial internal reflux, and when withdrawn from the bottom of the column through line 31, a portion may be discarded by means of valved line 32, and the remainder pumped by pump 33 to heat exchanger 20 and thence to the upper section of the column to serve as rectifying absorption medium.

Thus, in accordance with this embodiment of the invention separate streams of air and natural gas are combined to produce separate streams of methane-oxygen of the desired composition, of nitrogen derived from both the air and the natural gas, and of heavier hydrocarbons. It will be understood that requirements for any additional refrigeration will be provided by external refrigeration, the particular requirements depending on the particular process involved.

Figure 2 represents a process similar to that shown in Figure 1 with certain modifications. The illustrative embodiment shown in Figure 2 comprises two well-defined stages, a first or rectified absorption stage, and a second or rectified stripping stage. In this embodiment both the rectified absorption stage and the rectified stripping stage are provided with reflux derived from expansion-cooling of the respective overhead products. Expansion-cooling of product nitrogen provides reflux for the absorber column, while expansion-cooling of product methane-oxygen mixture provides reflux for the stripper column.

Referring more specifically to Figure 2, feed-air is precooled by cold product nitrogen in exchanger 41 and then subjected to rectified absorption in an absorber 42, by means of liquefied natural gas constituents delivered to absorber 42 through a line 44. The natural gas fraction which passes through line 44 is cooled by heat exchange with cold product nitrogen in an exchanger 45. As a result of the counterflow of the air and the liquefied natural gas fraction in absorber 42, the oxygen of the air is absorbed in and/or liquefied with the natural gas fraction and is withdrawn from the lower part of the absorber by means of a line 46. The overhead nitrogen, together with a portion of methane, is cooled in heat exchanger 47 by means of product nitrogen which has been expansion-cooled in an expander 49. By this means nitrogen and/or methane reflux is provided for the upper part of the absorber and loss of methane with product nitrogen is minimized. Condensate produced in exchanger 47 is returned to the absorber by means of a line 50.

The oxygen-enriched liquefied natural gas fraction withdrawn from the lower part of the absorber 42 is delivered through line 46 to an upper section of a rectifying stripper 51 wherein it is stripped of most of the oxygen by suitable means to yield an overhead methane-oxygen product having a desired ratio of methane to oxygen. In accordance with the embodiment illustrated in Figure 2 the stripping is effected by the introduction of low temperature natural gas containing methane vapor into a lower section of the stripper. The natural gas is first cooled by heat exchange in exchanger 52 with cold methane-oxygen product, then expanded from the high pressure under which it is normally taken from a ground reservoir, or to which it may be compressed by external compression followed by a usual indirect water cooling to remove heat of compression, to the normally desired working pressure to be maintained in the stripper, of the order of atmospheric or preferably about 25 p. s. i. a. This expansion-cooling effected by means of expander 54 produces the desired low temperature methane vapor which is delivered to the stripper through a line 55. A mixture of methane and oxygen is withdrawn from the stripper as overhead through line 56 and subjected to self heat exchange in exchanger 57 to produce reflux for the top section of the stripper which is returned thereto through line 59. Refrigeration for the condensation in exchanger 57 is obtained by self refrigeration expansion of product methane-oxygen in expander 60. The thus refrigerated product methane-oxygen is used in exchanger 57 to provide refrigeration to produce the reflux condensate and thereafter it is heat exchanged with the feed natural gas in exchanger 52.

Residual liquefied natural gas hydrocarbons with some dissolved (and/or liquefied and admixed) oxygen, together with additional liquefied natural gas hydrocarbons, including methane, resulting from the introduction to the stripper of expansion-cooled stripping natural gas as described above, are withdrawn from the bottom of the stripper through a line 62. This lean oil fraction is recycled by means of a pump 64 in valved line 44 to exchanger 45 and thence to the rectified absorber 42. A portion of the lean oil fraction is withdrawn from the system by means of valved line 65 to keep the content of higher hydrocarbons in the absorption oil from becoming too high, the amount of bleeding required depending on the composition of the natural gas, the required temperatures at the different points of the process, etc.

It will be understood that indirect heat transfer means may be provided for the stripping operation as shown in Figure 1. Also, provision may be made in this application of the invention for nitrogen occurring in the natural gas similar to the method whereby it was separated in Figure 1.

The foregoing descriptions of embodiments of the invention are illustrated but are not limitative. In view of the aforesaid descriptions, various modifications of the invention will occur to those skilled in the art. Thus, it will be seen that instead of utilizing "cold" in the methane-oxygen stream withdrawn from column 14 by means of line 27 to aid in precooling the feed air, the feed air may be used as an indirect reboiling (stripping) means in the lower part of the column to effect part of the required stripping and whereby the feed air is precooled before passing to the rectifying absorption zone of the column. In another modification the feed-air may serve as indirect reboiler means for the stripping zone and the cold product nitrogen used to precool the natural gas, the precooled natural gas further being expansion-cooled, separated in a suitable separator into low temperature liquid, which is utilized as absorption medium, and low temperature methane vapor, which is utilized as stripping means in the stripping zone.

The invention will be more fully understood by the following description of operating conditions for a particular application of the invention as practiced by the method illustrated in Figure 1. Dried air at about 100° F. is cooled in cold accumulator or exchanger 11, such as a Linde-Franckel exchanger, against product nitrogen, and then delivered to the absorption zone at a pressure of about 25 p. s. i. a. Lean oil (principally methane) from the bottom of the stripping zone and at a temperature of about −247° F. is cooled to about −255° F. by indirect heat exchange with product nitrogen at about −312° F. in exchanger 20. A temperature of about −311° F. is maintained at the top of the rectifying absorption zone by means of product nitrogen expansion in expander 19 to a temperature of about −318° F. This low temperature maintains sufficient nitrogen reflux at the 25 p. s. i. a. pressure to prevent loss of methane with the nitrogen. Natural gas under several hundred pounds per square inch pressure as obtained from a ground reservoir is heat exchanged in a suitable cold accumulator or exchanger 24 with cold product methane-oxygen and thereby cooled to about −180° F. and a pressure of 200 p. s. i. a. A portion of the gas is expansion-cooled by means of expander 29 to a pressure of about 25 p. s. i. a and a temperature of about −247° F. The separated residual uncondensed nitrogen is injected into the column just above the air-feed entrance level. The condensate is fed into a lower part of the column, admixed with a further quantity of the natural gas, expanded to about 25 p. s. i. a. and −247° F. A gaseous mixture of methane and oxygen in a mol ratio of two to one is withdrawn through line 27 at −255° F. and 25 p. s. i. a. Oxygen-lean liquid hydrocarbon fraction is withdrawn from the bottom of the column at about −247° F. and 25 p. s. i. a. and recycled to the absorption zone of the column.

The particular combination of conditions of operations, such as temperatures, pressures, relative proportions of materials, and the like, will depend on the nature of the raw materials and conditions under which they are available, upon the desired proportions of the desired components in the final product streams, etc. Thus, when the raw material natural gas is already substantially free from nitrogen, no provision need be made for by-passing nitrogen from the natural gas streams around the rectified stripping zone. Since the separation of the oxygen from the nitrogen of the air is effected at low temperatures in the order of those temperatures at which the low molecular weight hydrocarbons are liquid under normal atmospheric and higher pressures, and since some of these low molecular weight hydrocarbons have freezing points not far removed from their boiling points, due consideration must be made for the variability of the relative proportions of different low molecular weight hydrocarbons in natural gas materials from different sources. Of course, advantage may be taken of solubility relationships and freezing point lowerings due to solution, to operate in some cases under conditions which would not be permissible due to solidification when using pure substances.

The ratio of the amount of the absorption medium to the amount of air rectified thereby will depend on the relative temperatures of the two prior to contacting, and on the solution relationship between the liquid hydrocarbon medium and the oxygen under the given conditions, which conditions as already noted will depend on the relative proportions of the various hydrocarbons in the natural gas. The relative amount of vapor of low molecular weight hydrocarbon, for example methane, utilized in the stripping operation depends on the required vaporization of oxygen and the required replacement of higher hydrocarbons, from the absorption medium, by lower hydrocarbons, e. g. methane, all of which again relates to the nature of the starting materials. Although, for the production of synthesis gas composed of hydrogen and carbon monoxide in the mol ratio of two to one, it is desired to produce a mixture of methane and oxygen by practice of the present invention in a mol ratio of two to one, any other desired ratio may be produced and the mixture may be withdrawn either as a gaseous mixture or as a liquid mixture. Of course, the operating conditions will depend on the desired ratio and also on whether a gaseous or liquid mixture is desired. It will be understood, for example, that a withdrawn vapor mixture of methane and oxygen in a mol ratio of two to one is not an equilibrium vapor mixture of a liquid mixture having the same composition.

In order to simplify the description of application of the invention many of the required valves, pumps, flow measuring and control devices, temperature measuring and control devices, etc., have been omitted. The proper placement of such means and devices will be understood by one skilled in the art in view of the foregoing descriptions.

I claim as my invention:

1. The method of producing methane-oxygen mixtures which comprises: countercurrently contacting in a rectifying absorption zone an upwardly flowing stream of precooled air and a downwardly flowing stream of a liquefied portion of natural gas containing a major proportion of methane to produce a separated stream of nitrogen which is substantially free from oxygen and hydrocarbons and a liquefied phase comprising natural gas hydrocarbons and oxygen, and subsequently countercurrently contacting the aforesaid liquefied phase in a stripping zone with low temperature methane vapor to produce a methane-oxygen fraction containing substantial proportions each of methane and of oxygen and a residual oxygen-lean liquefied natural-gas phase.

2. The method of producing methane-oxygen mixtures which comprises: countercurrently contacting in a rectifying absorption zone an upwardly flowing stream of precooled air and a downwardly flowing stream of a liquefied portion of natural gas containing a major proportion of methane to produce a separated stream of nitrogen which is substantially free from oxygen and hydrocarbons and a liquefied phase comprising natural gas hydrocarbons and oxygen; and subsequently countercurrently contacting the aforesaid liquefied phase in a stripping zone with methane vapor under conditions to produce a methane-oxygen fraction containing substantial proportions each of methane and of oxygen and a residual oxygen-lean liquefied natural-gas phase.

3. The method of producing methane-oxygen mixtures which comprises: countercurrently contacting in a rectifying absorption zone an upwardly flowing stream of precooled air and a downwardly flowing stream of a liquefied portion of natural gas containing a major proportion of methane to produce a separated stream of nitrogen gas and a liquefied phase comprising natural gas hydrocarbons and oxygen and which is substantially free of nitrogen; expansion-cooling the separated stream of nitrogen gas to produce self-refrigeration and utilizing this self-refrigeration to produce reflux for the rectifying absorption zone, and subsequently countercurrently contacting the aforesaid liquefied phase in a stripping zone with methane vapor under conditions to produce a separated methane-oxygen fraction containing substantial proportions each of methane and of oxygen and a residual oxygen-lean liquefied natural-gas phase.

4. The method of producing methane-oxygen mixtures which comprises: countercurrently contacting in a rectifying absorption zone an upwardly flowing stream of precooled air and a downwardly flowing stream of a liquefied portion of natural gas containing a major proportion of methane to produce a separate overhead stream of nitrogen gas and a liquefied phase comprising natural gas hydrocarbons and oxygen and which is substantially free of nitrogen; expanding the separated stream of nitrogen gas and thereby producing self-refrigeration and utilizing this self-refrigeration to produce reflux for the rectifying absorption zone; subsequently subjecting the separated stream of nitrogen to heat exchange with air to be used in the process; countercurrently contacting the aforesaid liquefied phase comprising natural gas hydrocarbons and oxygen in a stripping zone with a low temperature hydrocarbon vapor comprising essentially methane under conditions to produce a separated methane-oxygen fraction containing substantial proportions each of methane and of oxygen and a residual oxygen-lean liquefied natural-gas phase, the aforesaid low temperature hydrocarbon vapor having been produced by expanding a portion of natural gas from a superatmospheric pressure to a lower pressure to effect self-refrigeration; subjecting the aforesaid separated methane-oxygen fraction to heat exchange with natural gas to be used in the process; and recycling the aforesaid residual oxygen-lean liquefied natural-gas phase to the rectifying absorption zone.

5. The method of producing hydrocarbon-oxygen mixtures which comprises: countercurrently contacting in a rectifying absorption zone an upwardly flowing stream of precooled air and a downwardly flowing stream of a liquefied portion of natural gas containing a major proportion of methane to produce a separated overhead stream comprising essentially nitrogen and a liquefied phase comprising essentially natural gas hydrocarbons and oxygen; expanding the separated overhead stream to produce self-refrigeration, and utilizing this self-refrigeration to produce reflux for the rectifying absorption zone; subsequently subjecting the separated overhead stream to heat exchange with fresh air to be used in the process; countercurrently contacting the aforesaid liquefied phase comprising natural gas hydrocarbons and oxygen in a stripping zone with low temperature methane vapor under conditions to produce a separated methane-oxygen fraction containing substantial proportions each of methane and oxygen and a residual oxygen-lean liquefied natural-gas phase, the aforesaid low temperature methane vapor having been produced by expanding a portion of natural gas from a superatmospheric pressure to a lower pressure to effect self-refrigeration and at least partial separation into a methane vapor phase and a liquefied phase of natural-gas hydrocarbons; subjecting the aforesaid separated methane-oxygen fraction to heat exchange with natural gas to be used in the process; and combining the aforesaid residual oxygen-lean liquefied natural-gas phase and the aforesaid liquefied phase of natural-gas hydrocarbons and recycling at least a portion of the resulting mixture to the rectifying absorption zone.

6. The method producing hydrocarbon-oxygen mixtures which comprises: countercurrently contacting in a rectifying absorption zone a stream of a liquefied portion of natural gas containing a major proportion of methane to produce a separated stream comprising essentially nitrogen and a liquefied phase comprising essentially natural gas hydrocarbons and oxygen; expanding the separated stream comprising nitrogen to produce self-refrigeration, and utilizing this self-refrigeration to produce reflux for the rectifying absorption zone; countercurrently contacting the aforesaid liquefied phase comprising natural gas hydrocarbons and oxygen in a stripping zone with low temperature methane vapor under conditions to produce a separated methane-oxygen fraction containing substantial proportions each of methane and of oxygen and a residual oxygen-lean liquefied natural-gas phase, the aforesaid low temperature methane vapor having been produced by expanding a portion of natural gas from a superatmospheric pressure to a lower pressure to effect self-refrigeration; and recycling at least a portion of the aforesaid residual oxygen-lean liquefied natural-gas phase to the rectifying absorption zone.

7. The method which comprises countercurrently contacting in a rectifying absorption zone an upwardly moving stream of precooled air and a downwardly flowing stream of a liquefied portion of natural gas containing a major proportion of methane under conditions of temperature and pressure and proportions of contacting materials adapted to effect a substantial separation of the oxygen from the nitrogen of the air and separately withdrawing from the absorption zone an oxygen-enriched hydrocarbon liquid phase containing substantial proportions each of oxygen and of methane and a nitrogen-enriched gaseous phase.

8. The method which comprises countercurrently contacting in a rectifying absorption zone an upwardly moving stream of precooled air and a downwardly flowing liquefied stream of low molecular weight hydrocarbons containing a major proportion of methane under conditions of temperature and pressure and proportions of contacting materials adapted to effect a substantial separation of the oxygen from the nitrogen of the air and separately withdrawing from the absorption zone an oxygen-enriched hydrocarbon liquid phase containing substantial proportions each of oxygen and of a low molecular weight hydrocarbon and a nitrogen-enriched gaseous phase.

9. The method which comprises countercurrently contacting in a rectifying absorption zone an upwardly moving gaseous stream of a precooled mixture consisting essentially of nitrogen and oxygen, each in substantial proportions, with a downwardly flowing liquefied stream consisting essentially of methane under conditions of temperature and pressure and proportions of contacting materials adapted to effect a substantial separation of the oxygen from the nitrogen of said mixture and separately withdrawing from the absorption zone an oxygen-methane liquid phase containing substantial proportions each of oxygen and of methane and a nitrogen-enriched gaseous phase.

10. The method which comprises countercurrently contacting in a rectifying absorption zone an upwardly moving gaseous stream of a precooled mixture consisting essentially of nitrogen and oxygen, each in substantial proportions, with a liquefied low molecular weight hydrocarbon which has a freezing point of the order of the freezing point of methane and of the order of the boiling point of oxygen, under conditions of temperature and pressure and proportions of said contacting materials adapted to maintain a major proportion of the hydrocarbon in the liquefied state and to liquefy a substantial proportion of the oxygen of said mixture while maintaining a major proportion of the nitrogen of said mixture in a gaseous state and to produce an oxygen-enriched liquid phase containing substantial proportions each of oxygen and of said hydrocarbon and a nitrogen-enriched gaseous phase and separating said last-mentioned liquid and gaseous phases.

11. The method which comprises intimately contacting an upwardy moving gaseous stream of a precooled mixture consisting essentially of nitrogen and oxygen, each in substantial proportions, with a liquefied low molecular weight hydrocarbon which has a freezing point of the order of the freezing point of methane and of the order of the boiling point of oxygen, under conditions of temperature and pressure and proportions of contacting materials adapted to maintain a major proportion of the hydrocarbon in the liquefied state and to liquefy a substantial proportion of the oxygen of said mixture while maintaining a major proportion of the nitrogen of said mixture in a gaseous state and to produce an oxygen-enriched liquid phase containing substantial proportions each of oxygen and of said hydrocarbon and a nitrogen-enriched gaseous phase and separating said last-mentioned liquid and gaseous phases.

12. The method which comprises countercurrently contacting in a rectifying absorption zone an upwardly moving gaseous stream of a precooled mixture consisting essentially of nitrogen and oxygen, each in substantial proportions, with a liquefied mixture of low molecular weight hydrocarbons containing a major proportion of a first low molecular weight hydrocarbon which has a freezing point of the order of the freezing point of methane and of the order of the boiling point of oxygen, under conditions of temperature and pressure and proportions of said contacting materials adapted to maintain a major proportion of the hydrocarbon mixture in the liquefied state and to liquefy a substantial proportion of the oxygen of said mixture while maintaining a major proportion of the nitrogen of said mixture in a gaseous state and to produce an oxygen-enriched liquid phase containing substantial proportions each of oxygen and of said hydrocarbons and a nitrogen-enriched gaseous phase, and subsequently countercurrently contacting the aforesaid oxygen-enriched liquid phase in a stripping zone with low temperature vapor of low molecular weight hydrocarbon as characterized hereinbefore for said first low molecular weight hydrocarbon to produce a separated lower molecular weight hydrocarbon-oxygen fraction containing substantially only said first low molecular weight hydrocarbon and oxygen and each in substantial proportions and a residual oxygen-lean liquefied phase of the remainder of said hydrocarbons.

PHILIP H. DEMING.

REFERENCES CITED

The following references are of record in the file of this patent:

UNITED STATES PATENTS

| Number | Name | Date |
| --- | --- | --- |
| 2,185,980 | Roberst, Jr. | Jan. 2, 1940 |
| 2,195,976 | Schlitt | Apr. 2, 1940 |

Certificate of Correction

Patent No. 2,519,955                                                     August 22, 1950

PHILIP H. DEMING

It is hereby certified that error appears in the printed specification of the above numbered patent requiring correction as follows:

Column 11, line 20, after the word "method" insert *of*; line 22, after "zone" insert *a stream of precooled air and*;

and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*